United States Patent [19]
Poje et al.

[11] 3,820,975
[45] June 28, 1974

[54] METHOD FOR CONTROLLING PLANT GROWTH WITH SUBSTITUTED CYCLOHEXENONES

[75] Inventors: Albert J. Poje, Grandview, Mo.; Peter E. Newallis, Leawood, Kans.

[73] Assignee: Chemagro Corporation, Kansas City, Mo.

[22] Filed: Nov. 12, 1970

[21] Appl. No.: 89,042

[52] U.S. Cl. ............................ 71/98, 47/2, 71/72, 71/76, 71/77, 71/78, 71/88, 71/90, 71/103, 260/332.3 R, 260/347.2, 260/455, 260/586 R, 260/464, 424/331, 424/337
[51] Int. Cl. .............................................. A01n 9/12
[58] Field of Search ............ 71/123, 98, 77, 88, 72, 71/76, 78; 424/331, 337

[56] References Cited
UNITED STATES PATENTS
2,657,126   10/1953   Stewart et al. ........................ 71/123
3,273,992   9/1966   Treves et al. ........................ 71/123
3,658,909   4/1972   Napier ................................ 424/331

FOREIGN PATENTS OR APPLICATIONS
595,783   12/1947   Great Britain

OTHER PUBLICATIONS
Campaigne et al., J. Am. Chem. Soc. 76, 1272, 1954.

*Primary Examiner*—James O. Thomas, Jr.
*Attorney, Agent, or Firm*—Burgess, Dinklage & Sprung

[57] ABSTRACT

Plant growth regulant compositions and methods of regulating the growth of plants using certain 3-substituted 5,5-dimethylcyclohex-2-ene-1-ones, some of which are known, which possess plant growth regulant, fungicidal, insecticidal, and acaricidal properties and which may be produced by conventional methods.

6 Claims, No Drawings

METHOD FOR CONTROLLING PLANT GROWTH WITH SUBSTITUTED CYCLOHEXENONES

The present invention relates to and has for its objects the provisions for particular new 3-substituted 5,-5-dimethylcyclohex-2-ene-1-ones, i.e. alkylthio, hydroxyalkythio, cycloalkylthio, aralkylthio and chloro substituted aralkylthio, arylthio, and chloro or alkyl substituted arylthio, alkenylthio, dialkylaminothiocarbonylthio, dialkylaminocarbonylthio, alkoxycarbonylalkylthio and their corresponding sulfoxide, sulfones, and thiocyanates which possess plant growth regulant properties, active compositions in the form of mixtures of such compounds with solid and liquid dispersible carrier vehicles, and methods for producing such compounds and for using such compounds in a new way especially for regulating the growth of plants with other and further objects becoming apparent from a study of the within specification and accompanying examples.

It is believed that none of the 3-substituted 5,5-dimethyl-cyclohexenones of analogous constitution are known to possess strong plant growth regulating properties. Only the 3-ethylthio and 3-phenylthio-5,5-dimethylcyclohex-2-ene-1-ones have been reported in the literature (see Brit. Pat. No. 595,783; J. Am. Chem. Soc. 76 1272 (1954)).

It has been found, in accordance with the present invention, that plant growth regulant properties are exhibited by 3-substituted-5,5-dimethyl-cyclohexen-1-ones of the general formula:

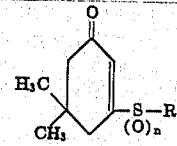

(I)

in which
R is
(a) di lower alkylaminocarbonyl,
di lower alkylaminothiocarbonyl, or
cyanato, when $n$ is 0, or
(b) alkyl of 1-14 carbon atoms,
hydroxy lower alkyl,
cycloalkyl having 5 or 6 carbon atoms,
phenyl lower alkyl,
chloro - or
bromophenyl lower alkyl,
chlorophenylthio lower alkyl,
phenyl,
chlorophenyl,
lower alkylphenyl,
lower alkyl phenyl lower alkyl,
lower alkoxy phenyl lower alkyl,
lower alkenyl,
lower alkoxy carbonyl
furfuryl
thenyl
lower alkoxycarbonyl lower alkyl, or lower alkylthiocarbonyl
lower alkyl, when $n$ is 0, 1 or 2.

It has been furthermore found, in accordance with the present invention, that the sulfides of formula (1) above may be produced by a process which comprises reacting the corresponding alpha, beta unsaturated chloro ketone of the formula:

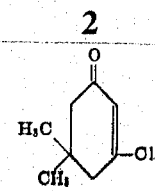

(II)

with a sulfur nucleophile, i.e. a mercaptan in the presence of an acid-binding agent, or the salt form of such mercaptan, of the formula:

RS—M (III)

in which R is the same as defined above and M is a hydrogen or a salt-forming cation, such as ammonium or alkali metal (e.g. Na, K, etc.), optionally in the presence of a solvent.

If, for example, ethyl mercaptan and 3-chloro-5,5-dimethylcyclohex-2-ene-1-one are used as starting materials with potassium hydroxide as the HCl acceptor, the course of the reaction can be represented by the following equation:

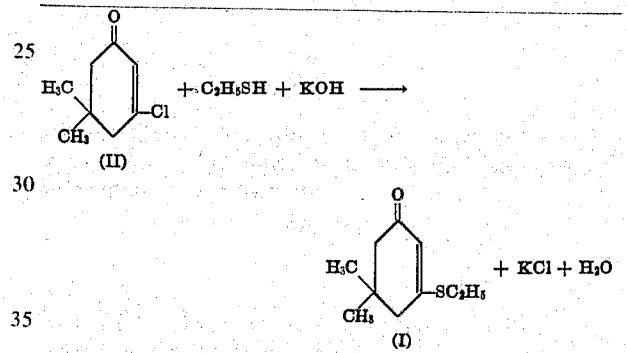

It has been furthermore found, in accordance with the present invention, that sulfoxides of formula (VI) may be produced by a process which comprises reacting the corresponding sulfides (V) with the appropriate quantity of oxidizing agents such as $KMnO_4$, $H_2O_2$, $NaIO_4$ and m-chloroperbenzoic acid; the course of the reaction can be represented by the following equation:

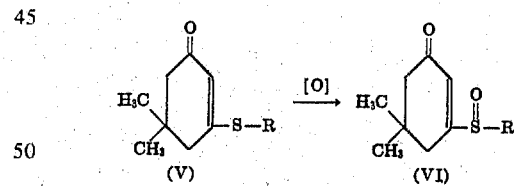

If, for example, 3-ethylthio-5,5-dimethylcyclohex-2-ene-1-one, and m-chloroperbenzoic acid are used as starting materials, the course of the reaction can be represented by the following equation:

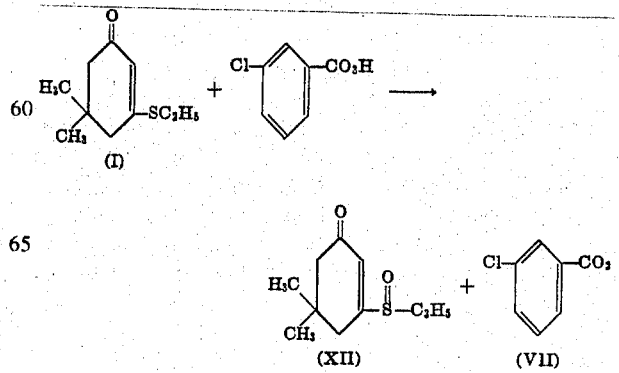

It has been furthermore found, in accordance with the present invention, that sulfones of the formula (VIII) may be produced by a process which comprises reacting the corresponding sulfide (V) or sulfoxide (VI) with the appropriate amount of oxidizing agent such as $KMnO_4$, $H_2O_2$, $NaIO_4$ and m-chloroperbenzoic acid, in which R is the same and defined as above, optionally in the presence of a solvent, the course of the reaction can be represented by the following equation:

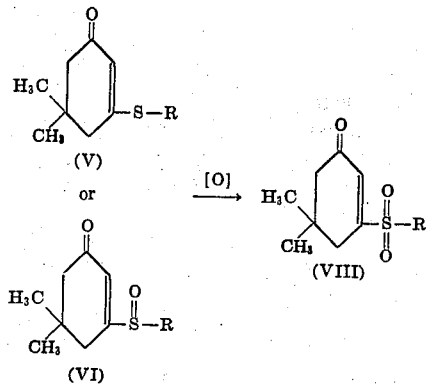

If, for example, 3-ethylthio (I) or 3-ethylsulfinyl (XII) -5,5-dimethylcyclohex-2-ene-1-one and m-chloroperbenzoic acid are used as starting materials, the course of the reaction can be represented by the following equation:

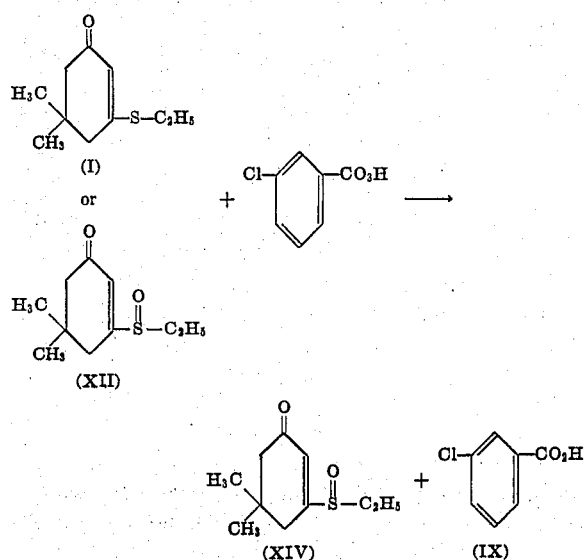

In order to produce the desired sulfoxides or sulfones, the sulfides (V) can be oxidized (optionally in the presence of a solvent) by one of the common oxidizing agents such as, for example, potassium permanganate, hydrogen peroxide, sodium m-periodate, m-chloroperbenzoic acid, oxygen, peracetic acid, and the like.

Alternatively, it has been furthermore found, in accordance with the present invention, that sulfones of the formula (VIII) may be produced by a process which comprises reacting the 3-chloro-5,5-dimethylcyclohex-2-ene-1-one (II) with an alkali salt of a sulfinic acid, of the formula

in which R is the same as defined above and M is a salt-forming cation, such as ammonium or alkali metal (e.g. Na, K, etc.), optionally in the presence of a solvent such as methanol.

If, for instance, 3-chloro-5,5-dimethylcyclohex-2-ene-1-one and sodium benzenesulfinate are used as starting materials with methanol as the solvent, the course of the reaction can be represented by the following equation:

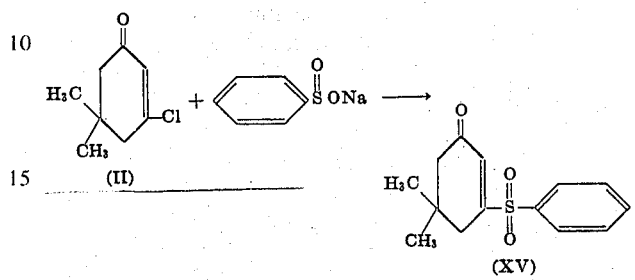

Most of the 3-substituted 5,5-dimethylcyclohex-2-ene-1-ones of the present invention are new compounds and selected ones exhibit a wide range of biological activity.

Advantageously, in accordance with the present invention, in the various formulae herein:

R represents:

alkyl hydrocarbon of 1–14 carbon atoms including straight and branched chains such as methyl, ethyl, n- and iso-propyl, n-, iso-, sec.- and tert. -butyl, n- and iso-amyl, n- and iso-hexyl, heptyl, octyl, nonyl, decyl, undecyl, dodecyl, tridecyl, tetradecyl, and the like;

phenyl, phenyl substituted with 1 to 5 chloro or lower alkyl of 1 to 4 carbon atoms, such as methyl to tert. -butyl inclusive, and the like as defined above especially 2-, 3-, 4-mono and 2,3-; 2,4-; 2,5-; 2,6-; 3,4- and/or 3,5-dichloro and $C_{1-4}$ alkyl substituents;

hydroxyalkyl of 1-4 carbon atoms;

cycloalkyl of 5 or 6 carbon atoms;

phenyl lower alkyl, and phenyl lower alkyl with phenyl substituted with alkyl groups of 1–3 carbon atoms and chlorine and bromine;

alkenyl of 3–5 carbon atoms;

cyanato;

di-lower alkylaminothiocarbonyl having 1 to 4 carbon atoms in each alkyl moiety, such as di-(same or mixed) methyl to tert. -butyl inclusive and the like, as defined above;

di-lower alkylaminocarbonyl having 1 to 4 carbon atoms in each alkyl moiety, such as di-(same or mixed) methyl to tert. -butyl inclusive and the like, as defined above;

lower alkoxy carbonyl - lower alkyl having 1 to 4 carbon atoms in the alkoxy moiety and 1 to 4 carbon atoms in the alkyl moiety, such as methoxy, ethoxy, n- and iso-propoxy, n-, iso-, sec.- and tert. -butoxy, and the like, carbonyl-methyl to tert. -butyl inclusive and the like, as defined above.

Preferably, R is $C_{1-5}$ alkyl, especially $C_{1-2}$; or 4-chlorophenyl; 2,4-dichlorophenyl or methylphenyl; or cyanato; or di-($C_{1-4}$ or $C_{1-2}$) aminothiocarbonyl; or $C_{1-4}$ alkoxy carbonyl-$C_{1-4}$ or $C_{1-2}$ alkyl; or hydroxyethyl, or allyl; and the respective sulfoxides and sulfones, excluding these sulfur oxides when R is cyanato, di-lower alkylaminothiocarbonyl, and di-lower alkylaminocarbonyl.

The preferred compounds include:

1. 3-ethylthio-5,5-dimethylcyclohex-2-ene-1-one
2. 3-methylthio-5,5-dimethylcyclohex-2-ene-1-one 3. 3-methylsulfonyl-5,5-dimethylcyclohex-2-ene-1-one
4. 3-isopropylthio-5,5-dimethylcyclohex-2-ene-1-one
5. 3-(isopropylsulfinyl)-5,5-dimethylcyclohex-2-ene-1-one
6. 3-ethoxycarbonylthio-5,5-dimethylcyclohex-2-ene-1-one
7. 3-diethylaminothiocarbonylthio-5,5-dimethylcyclohex-2-ene-1-one
8. 3-tert.-butyl 5,5-dimethylcyclohex-2-ene-1-one
9. 3-(thiocyanato)-5,5-dimethylcyclohex-2-ene-1-one
10. 3-allylthio-5,5-dimethylcyclohex-2-ene-1-one
11. 3-(2-p-chlorophenylthioethylthio)-5,5-dimethylcyclohex-2-ene-1-one
12. 3-(ethylsulfinyl)-5,5-dimethylcyclohex-2-ene-1-one
13. 3-(p-chlorophenyl sulfinyl)-5,5-dimethylcyclohex-2-ene-1-one
14. 3-(ethylsulfonyl)-5,5-dimethylcyclohex-2-ene-1-one
15. 3-(phenyl-sulfonyl)-5,5-dimethylcyclohex-2-ene-1-one
16. 3-(cyclohexylsulfonyl)-5,5-dimethylcyclohex-2-ene-1-one
17. 3-(cyclohexosulfinyl)-5,5-dimethylcyclohex-2-ene-1-one The types of starting sulfur nucleophiles which can be used in accordance with the process of the present invention are clearly characterized by formula (III) as stated above.

These starting compounds are also well-known and can be prepared readily on an industrial scale.

As examples of such starting sulfur nucleophiles which can be used with a hydrogen chloride acceptor or directly as an ammonium, or alkali metal salt (e.g., sodium or potassium salt) according to the present invention, there may be mentioned in particular:

methyl mercaptan,
ethyl mercaptan,
isobutyl mercaptan,
n-dodecyl mercaptan,
1,1-dimethyl-decyl mercaptan (i.e. 2-methyl-undec-2-yl mercaptan),
benzenethiol,
4-chloro-benzenethiol,
2,4-dichloro-benzenethiol,
4-methylbenzenethiol,
4-tert.-butylbenzenethiol,
ammonium thiocyanate,
sodium thiocyanate,
potassium thiocyanate,
trimethylammonium N,N-dimethyl-dithiocarbamate,
sodium N,N-dimethyl-dithiocarbamate,
n-butylalpha-mercaptoacetate,
ethyl alpha-mercaptoacetate,
furfuryl mercaptan,
thenyl mercaptan,
p-chlorobenzyl mercaptan,
p-methoxybenzyl mercaptan,
methallyl mercaptan,
cyclopentyl mercaptan,
p-tert.-butyl mercaptan, and the like.

The alpha, beta unsaturated chloro ketone used in this work was 3-chloro-5,5-dimethylcyclohex-2-ene-1-one; other similar compounds can be used according to the present invention, i.e. 3-bromo-5,5-dimethylcyclohex-2-ene-1-one.

The production reaction is carried out in the presence of an inert organic solvent (this term also includes a mere diluent). Examples of such solvents are esters such as ethyl acetate, ketones such as acetone or methyl ethyl ketone, nitriles such as acetonitrile, amides such as dimethylformamide and dimethylacetamide and sulfones such as tetrahydrothiophene-1,1-dioxide; and the like. The preferred solvents are acetone and acetonitrile.

In the case where a free mercaptan is used, it is advantageous to utilize an acid-binding agent such as a tertiary amine or inorganic base to bind the liberated hydrogen chloride. Normally, the acid-binding agent is used in an equimolar amount, based on the free mercaptan. Tertiary amines which can be employed are triethylamine pyridine, 2-, 3- and 4-picolines, sym-collidine, and the like, and inorganic bases which can be employed are, for example, sodium carbonate, potassium carbonate, and the like.

The reaction temperature may be varied within a fairly wide range. In general, the reaction is carried out at substantially between about 20°–150° C., preferably between about 40°–100° C.

In general, the reactants are used in approximately equimolar proportions. The order of addition of the reactants can be varied, although usually the alpha, beta unsaturated chloro ketone is added to the mercaptan or its salt.

Catalysts such as potassium iodide may be used optionally to facilitate the reaction described for the preparation of the sulfides, if desired.

After completion of the reaction, any solid is filtered and the volatile constituents present in the organic phase are evaporated in the usual way. The residue may then be extracted with a water immiscible solvent such as methylene chloride, chloroform, benzene, and the like, and the organic solution may then be washed with water. Drying may be accomplished with one of the common drying agents such as magnesium sulfate, sodium sulfate, magnesium chloride, and the like, and the solvent is removed under vacuum, leaving the product as the residue, which in many cases can be recrystallized or distilled.

After completion of the reaction for the preparation of sulfoxides or sulfones, the acetic acid may be removed by distillation under vacuum in the usual manner. The residue is then obtained as product which is washed with a dilute sodium bicarbonate solution, followed by water, dried in the usual manner and, in many cases, can be recrystallized.

Advantageously, the active compounds, according to the present invention, exhibit plant growth regulating properties with comparatively low toxicity to warm-blooded creatures and concomitantly low phytotoxicity. Hence, the instant compounds are suitable for use as plant growth regulants. Some of the selected compounds may possess biological activity in other areas. For example, they may be used as insecticides, herbicides, defoliants, or desiccants.

The instant compounds can be used in one or more of the various methods for the regulation of the growth of plants in such a way as to be beneficial to the plant and at concentrations which are not phytotoxic to such vegetation. The uses to which the compounds of this invention may be put include or comprise methods for using such compounds in a new way, such as stunting the growth of monocotyledonous and dicotyledonous crop and/or weed plants, ornamentals, shrubs and trees. Compounds of this invention may have beneficial and economical effects on the above mentioned plants, such as increasing the yield of leguminous plants and/or increasing the protein content of such plants, affecting the fruit set of spermatophytic plants, increasing the resistance of vegetation to damage caused by drought or frost and increasing the sugar yield of sugar beets or sugarcane. Either alone or in synergistic combinations with known retardants such as maleic hydrazide, the compounds of this invention may retard the growth of grasses or shrubs or grassy weeds or trees, thereby producing an effect known commonly as chemical mowing or chemical pruning. Other forms of growth can be regulated such as the reduction of the undesirable growth of suckers as in tobacco plants or the sprouting of potatoes. Other physiological effects which may be desired are in the sex expression and prevention of lodging which is important in the cereals and the thinning of fruits such as for apples and peaches. Other and further objectives of this invention will be apparent from a study of the following specifications and accompanying examples.

The active compounds according to the instant invention can be utilized, if desired, in the form of the usual formulations or compositions with conventional inert pesticide diluents or extenders, i.e. conventional pesticide dispersible carrier vehicles, such as solutions, emulsions, suspensions, emulsifiable concentrates, spray powders, pastes, soluble powders, dusting agents, granules, etc. These are prepared in known manner, for instance, by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as siluent, organic solvents may be added as auxiliary solvents. The following may be chiefly considered for use as conventional carrier vehicles for this purpose:

Inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, etheralcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as nonionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglocol ethers, magnesium stearate, sodium oleate, etc.); and/or dispersing agents, such as ligin, sulfite waste liquors, methyl cellulose, etc.

Such active compounds may be employed alone or in the form of mixtures with one another and/or with such solid and/or liquid dispersible carrier vehicles and/or with other known compatible active agents, especially plant growth regulating agents or plant protection agents, such as fungicides, or herbicides, insecticides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0001–2.0 percent, preferably 0.01–0.8 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent; such as an emulsifying agent and-/or a dispersing agent, and an amount of the active compound which is effective for the purpose in question and which is generally between about 0.0001–95 percent, and preferably 0.01–95 percent, by weight of the mixture.

The active compound can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques Only up to, at most, about a few liters/hectare are needed, and often amounts only up to about 1 quart-/acre, preferably 2–16 fluid ounces/acre, are sufficient. In this process, it is possible to use highly concentrated liquid compositions with said liquid carrier vehicles containing from about 20 to about 95 percent by weight of the active compound, or even the 100 percent active substance alone, e.g. about 20–100 percent by weight of the active compound.

Furthermore, the present invention contemplates methods for selectively controlling the rate of growth of plants; increasing their yield, their protein content, sugar content, resistance to frost and drought damage, preventing the growth of undesirable suckers or preventing the growth of sprouts and other objects of this invention heretofore mentioned by applying to at least one of (a) such plants and (b) their habitat, an efficacious amount of the particular active compound of this invention alone or together with the carrier vehicle as noted above. The instant formulations or compositions are applied in the usual manner; for example, by spraying, atomizing, scattering, dusting, watering, sprinkling, and the like, either to the soil around the plants, the plants themselves, or both.

It will be realized, of course, that in connection with the use of these compounds for influencing the growth of plants and for effecting other desirable results heretofore mentioned, the concentrations of the particular active compound utilized in admixture with the carrier vehicle will depend on the intended application and may be varied within a fairly wide range depending on the weather conditions, the purpose which the particular active compound is used, and the plant species on which it is intended to produce the desired effect. Therefore, in special cases, it is desirable to go above or below the aforementioned concentration ranges. The surprising plant growth regulatory activity of the particular active compounds of the present invention is illustrated, without limitation, by the following examples.

EXAMPLE 1

Growth Regulatory Activity

Cucumber Root Test
  Wettable powder base consisting of:
  92 parts by weight hydrated silica (ultra fine, "Hi-Sil 233")
  4 parts by weight sodium lignin sulfonate ("Marasperse N")
  4 parts by weight polycondensate of ethylene oxide, propylene oxide and propylene glycol (mol. wt. about 1,000) ("Pluronic L 61")

To produce a suitable preparation of the particular active compounds, 1 part by weight of such active compound is mixed intimately with 1 part by weight of the stated wettable powder base. To prepare a 10,000 ppm. solution, 0.4 grams of the resulting mixture is dissolved by bringing a volume to 20 mls. with distilled water. Appropriate serial dilutions of each 1,000 ppm. and 100 ppm. are prepared from above 10,000 ppm. solution.

Whatman No. 1 filter paper is placed in a 150 mm × 25 mm petri dish and 10 cucumber seeds are arranged on it in a row, the dish is then moistened with 7 mls of the specified dilution of the particular active compound.

Treated dishes are incubated in darkness at 22° C. Rating is determined on the base of growth response of the root during the period of 24 hours between the third and fourth day.

A 0 to 9 scale rating is used to indicate the activity of potential growth retardants. A 0 scale reading indicates growth retardation within the range of 0–10 percent as compared with the control. A 9 scale reading corresponds to 90 percent or more growth retardation. On the other hand, figures in parentheses indicate growth promotion or enhancement. Thus, a (0) to (9) scale rating is used to indicate the activity of potential growth promotants. (0) indicates growth promotion within the range of 0–10 percent as compared with the control, whereas (9) indicates 90 percent or greater growth promotion when compared with the control.

The particular active compounds tested, the amount used and the results obtained can be seen from the following Table.

TABLE I

Growth regulatory activity (cucumber root test)

| Active compound | | Active compound concentration in p.p.m. | Growth response |
|---|---|---|---|
| | (I) | 10,000<br>1,000<br>100 | 9<br>9<br>7 |
| | (XII) | 5,000<br>500<br>50 | 9<br>9<br>9 |
| | (XIV) | 10,000<br>1,000<br>100 | 8<br>7<br>0 |
| | (XVIII) | 10,000<br>1,000<br>100 | 1<br>1<br>2 |

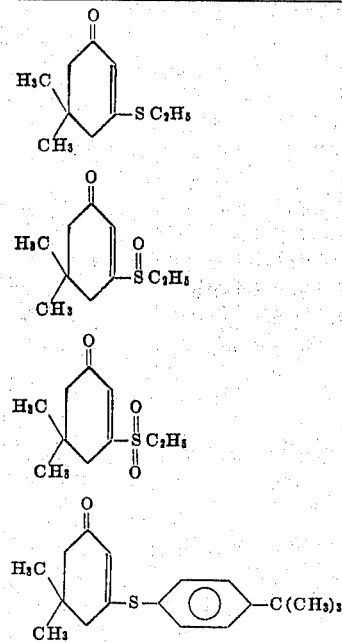

TABLE I.—Continued

| Active compound | | Active compound concentration in p.p.m. | Growth response |
|---|---|---|---|
| 4,4-dimethyl-2-(dodecylthio)-2-cyclohexen-1-one, —SC$_{12}$H$_{25}$ | (XIX) | 10,000<br>1,000<br>100 | 2<br>0<br>0 |
| 4,4-dimethyl-2-(cyclohexylthio)-2-cyclohexen-1-one, —SC$_6$H$_{11}$ | (XX) | 10,000<br>1,000<br>100 | 5<br>3<br>2 |
| 4,4-dimethyl-2-(2-hydroxyethylthio)-2-cyclohexen-1-one, —SCH$_2$CH$_2$OH | (XXI) | 10,000<br>1,000<br>100 | 9<br>9<br>2 |
| 4,4-dimethyl-2-(allylthio)-2-cyclohexen-1-one, —SCH$_2$CH=CH$_2$ | (X) | 10,000<br>1,000<br>100 | 9<br>9<br>8 |
| —SCH$_2$—⟨C$_6$H$_4$⟩—Cl | (XXII) | 5,000<br>500<br>50 | 3<br>4<br>3 |
| —S—⟨C$_6$H$_3$(CH$_3$)⟩—C(CH$_3$)$_3$ | (XXIII) | 10,000<br>1,000<br>100 | 1<br>2<br>3 |
| —SCH$_2$CH$_2$S—⟨C$_6$H$_4$⟩—Cl | (XI) | 10,000<br>1,000<br>100 | 9<br>7<br>2 |
| —S—⟨C$_6$H$_5$⟩ | (XXIV) | 10,000<br>1,000<br>100 | 6<br>8<br>1 |
| —SC(CH$_3$)$_3$ | (VIII) | 10,000<br>1,000<br>100 | 9<br>9<br>1 |
| —S—⟨C$_6$H$_4$⟩—Cl | (XXV) | 10,000<br>1,000<br>100 | 7<br>5<br>3 |
| —S—⟨C$_6$H$_4$⟩—CH$_3$ | (XXVI) | 10,000<br>1,000<br>100 | 5<br>4<br>3 |

TABLE 1.—Continued
| Active compound | | Active compound concentration in p.p.m. | Growth response |
|---|---|---|---|
| 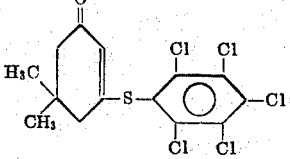 | (XXVII) | 10,000<br>1,000<br>100 | 7<br>1<br>(1) |
| 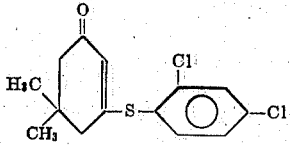 | (XXVIII) | 10,000<br>1,000<br>100 | 1<br>(6)<br>1 |
| 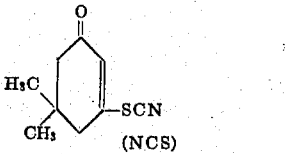 | (IX) | 10,000<br>1,000<br>100 | 9<br>8<br>5 |
| 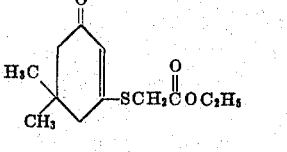 | (XXIX) | 10,000<br>1,000<br>100 | 9<br>9<br>1 |
| 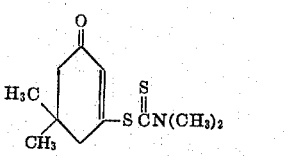 | (XXX) | 10,000<br>1,000<br>100 | 8<br>8<br>3 |
| 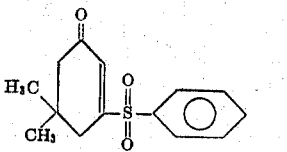 | (XV) | 10,000<br>1,000<br>100 | 9<br>9<br>7 |
| 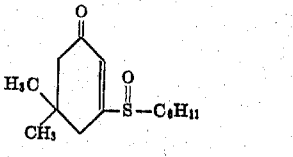 | (XVII) | 10,000<br>1,000<br>100 | 9<br>9<br>7 |
| 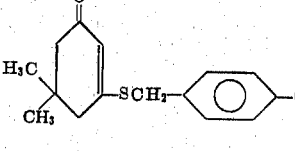 | (XXII) | 10,000<br>1,000<br>100 | 9<br>8<br>7 |
| 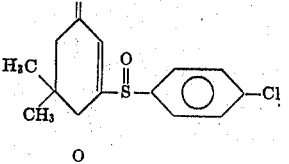 | (XIII) | 10,000<br>1,000<br>100 | 9<br>9<br>6 |
| 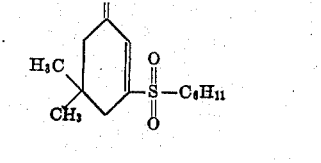 | (XVI) | 10,000<br>1,000<br>100 | 9<br>9<br>5 |

TABLE 1.—Continued

| Active compound | | Active compound concentration in p.p.m. | Growth response |
|---|---|---|---|
| [structure: H3C, CH3 substituted cyclohexenone with —S C(=O) N(n-C3H7)2] | (XXXI) | 10,000<br>1,000<br>100 | 9<br>6<br>0 |

EXAMPLE 2

Fungicidal Activity

Agar Plate Fungicide Test (Mycelium growth)

Solvent: 99 parts by weight distilled water
Dispersing Agent: 1 part by weight of Tween 20

To produce a suitable preparation of the particular active compound, 1 part by weight of such active compound is mixed with the stated amount of solvent containing the stated amount of dispersing agent.

The active compound preparation is added to potato dextrose agar (which has been liquefied by heating) in such an amount that the desired concentration of active compound is provided therein. After thorough shaking to achieve a uniform dispersion of the active compound, the agar is poured into Petri dishes under sterile conditions. Control dishes to which the active compound preparation has not been added are also set up.

When the mixture of substrate and active compound has solidified, the dishes are inoculated in the center of the plate with the species of fungi stated in the Table and incubated at room temperature (21°–25° C.) for 7 days.

After this time, the extent of mycelial growth is determined in relation to the growth of the untreated control by measuring the average radius of the fungal colony from the central point of inoculation to the periphery of mycelial growth. The inhibition of fungal growth is expressed by the values 0 to 10, wherein 0 means that there is no inhibition (full growth as in control) and 10 means that there is complate inhibition (absence of growth).

The particular active compounds tested, their concentrations in the agar used, the test fungi and the inhibition effects achieved can be seen from the following Table 2:

TABLE 2
Agar plate fungicide test

| Active compound | | Concentrate in p.p.m. | (1) | (2) | (3) | (4) | (5) | (6) | (7) |
|---|---|---|---|---|---|---|---|---|---|
| [4,4-dimethylcyclohexenone —S C2H5] | (I) | 500<br>100<br>10 | 10<br>8<br>2 | 8<br>5<br>0 | 8<br>0<br>0 | 10<br>10<br>5 | 10<br>0<br>0 | 10<br>0<br>0 | 10<br>2<br>0 |
| [4,4-dimethylcyclohexenone —S(=O) C2H5] | (XII) | 500<br>100<br>10 | 10<br>2<br>0 | 10<br>5<br>0 | 5<br>2<br>0 | 10<br>8<br>5 | 8<br>2<br>6 | 5<br>2<br>0 | 8<br>2<br>0 |
| [4,4-dimethylcyclohexenone —S C(CH3)3] | (VIII) | 500<br>100<br>10 | 8<br>2<br>0 | 5<br>0<br>0 | 8<br>0<br>0 | 8<br>0<br>0 | 5<br>0<br>0 | 5<br>0<br>0 | 8<br>2<br>0 |
| [4,4-dimethylcyclohexenone —SCH2CH=CH2] | (X) | 500<br>100<br>10 | 10<br>0<br>0 | 10<br>10<br>0 | 10<br>2<br>0 | 10<br>10<br>5 | 10<br>5<br>0 | 10<br>10<br>8 | 10<br>2<br>0 |
| [4,4-dimethylcyclohexenone —S—phenyl] | (XXIV) | 500<br>100<br>10 | 8<br>2<br>0 | 10<br>10<br>5 | 8<br>5<br>0 | 10<br>10<br>0 | 10<br>8<br>8 | 10<br>10<br>2 | 8<br>5<br>0 |

TABLE 2.—Continued

| Active compound | | Concentrate in p.p.m. | (1) | (2) | (3) | (4) | (5) | (6) | (7) |
|---|---|---|---|---|---|---|---|---|---|
| [structure with CH₃, CH₃, S–C₆H₄–Cl] | (XXV) | 500<br>100<br>10 | 5<br>2<br>0 | 5<br>2<br>0 | 5<br>2<br>0 | 10<br>8<br>5 | 5<br>2<br>0 | 8<br>0<br>0 | 0<br>0<br>0 |
| [structure with S–C(=S)N(CH₃)₂] | (XXX) | 500<br>100<br>10 | 10<br>8<br>5 | 8<br>0<br>0 | 0<br>0<br>0 | 10<br>10<br>0 | 8<br>8<br>0 | 10<br>10<br>0 | 10<br>8<br>0 |
| [structure with SO₂–C₆H₅] | (XV) | 500<br>100<br>10 | —<br>—<br>— | —<br>—<br>— | —<br>10<br>— | —<br>10<br>— | —<br>0<br>— | —<br>10<br>— | —<br>—<br>— |
| [structure with S(=O)CH₂–C₆H₄–Cl] | (XXXII) | 500<br>100<br>10 | 8<br>8<br>2 | 10<br>5<br>2 | 8<br>8<br>2 | 8<br>5<br>2 | 2<br>0<br>0 | 8<br>5<br>2 | 8<br>5<br>0 |
| [structure with S(=O)–C₆H₄–Cl] | (XIII) | 500<br>100<br>10 | 10<br>8<br>5 | 10<br>10<br>8 | 10<br>8<br>2 | 8<br>8<br>5 | 10<br>5<br>0 | 8<br>5<br>2 | 10<br>8<br>2 |

[1] *Ceratocystis ulmi.*
[2] *Colletotrichum obiculare.*
[3] *Fusarium oxy. f. lycopersici.*
[4] *Fusarium nivale.*
[5] *Helminthosporium sativum.*
[6] *Rhizoctonia solani.*
[7] *Verticillium albo-atrum.*

EXAMPLE 3

Insecticidal Action

Housefly Test (contact action)
(*Musca domestica*)

Solvent: 10 milliliters acetone

To produce a suitable preparation of the particular active compound, 100 mg. of such active compound are mixed with the stated amount of the stated volatile solvent, and the resulting concentrate is diluted with further solvent to the desired final concentration.

One ml. of the resulting active compound preparation is placed into an 8-ounce wide-mouth jar and an additional 4 ml. of said solvent are added. The solvent is allowed to evaporate leaving a uniform dry film residue. Twenty flies (*Musca domestica*) are then placed in the jar and covered with a screen top. A cotton pad soaked in a 10 percent sugar-water solution is placed on top of the screen as food supply.

After each of the periods of time stated in the following table, the degree of destruction is determined and expressed as a percentage: 100 percent means that all, 0 percent means that none, of the test creatures are killed.

The particular active compounds tested, the amounts used and the results obtained can be seen from the following Table:

TABLE 3

House fly test (contact action)

| Active compound | | Amount of active compound applied in mmg./dish | Mortality in percent after exposure of house fly for— | |
|---|---|---|---|---|
| | | | 2 hours | 18 hours |
| [structure with CH₃, CH₃, S–C₂H₅] | (I) | 1,000 | 96 | 100 |

TABLE 3.—Continued

House fly test (contact action)

| Active compound | | Amount of compound applied in mmg./dish | Mortality in percent after exposure of house fly for— | |
|---|---|---|---|---|
| | | | 2 hours | 18 hours |
| [structure with $CH_3$, $CH_3$, $S\text{-}CH_2H_5$, O, O] | (XII) | 1,000 | 3 | 20 |
| [structure with $CH_3$, $CH_3$, $S\text{-}CH_2\text{-}C_6H_4\text{-}Cl$] | (XXII) | 1,000 | 3 | 23 |
| [structure with $CH_3$, $CH_3$, $S\text{-}C_6H_4\text{-}Cl$] | (XXV) | 1,000 | 3 | 83 |
| [structure with $CH_3$, $CH_3$, $SO_2\text{-}C_6H_5$] | (XV) | 1,000 | 16 | 40 |

EXAMPLE 4

Acaricidal Action

Two-spotted Spider Mite Test (Contact action)
(*Tetranychus urticae*)

Wettable powder base consisting of:
- 92 parts by weight hydrated silica (ultra fine, "Hi-Sil 233")
- 4 parts by weight sodium lignin sulfonate ("Maras-perse N")
- 4 parts by weight polycondensate of ethylene oxide, propylene oxide and propylene glycol (mol. wt. about 1,000) ("Pluronic L-61")

To produce a suitable preparation of the particular active compound, 1 part by weight of such active compound is mixed intimately with 1 part by weight of the stated wettable powder base, and the resulting mixture is diluted with water to the desired final concentration.

The active compound preparation is sprayed to dew moist onto a 4th leaf stage cotton plant which has been infested for 24 hours with at least 25 two-spotted spider mites. After three days, mortality observations are made and mortality (or kill) is expressed as the percentage of dead mites compared to the total number of mites on the cotton plant corrected for natural mortality.

100 percent means that all, and 0 percent means that none, of the mites have been immobilized.

The particular active compounds tested, their concentrations and the results obtained can be seen from the following Table:

TABLE 4
Two-spotted spider mite test (contact action)

| Active compound | | Active compound concentration in p.p.m. | after 3 days in percent |
|---|---|---|---|
| [structure with $CH_3$, $CH_3$, $SC(CH_3)_3$] | (VIII) | 1,000 | 60 |
| [structure with $CH_3$, $CH_3$, $S(O)\text{-}C_6H_4\text{-}Cl$] | (XIII) | 1,000 | 95 |

The following further examples are set forth to illustrate, without limitation, the process for producing the active compounds according to the present invention:

EXAMPLE 5

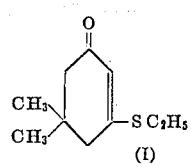

(I)

8.3 grams (0.133 mol.) of ethylmercaptan was added to a solution of 7.5 grams (0.133 moles) of KOH in 100 ml. of ethanol. To this mixture was added a solution of 20 grams (0.126 mole) of 3-chloro-5,5-dimethylcyclohex-2-ene-1-one dissolved in 200 ml. of ethanol at such a rate as to maintain a reaction temperature of approximately 40°–45° C. The reaction mixture was allowed to stand overnight, filtered and the volatiles were removed by distillation under reduced pressure. The residue was dissolved in methylene chloride, washed with water, dried with $MgSO_4$ and the volatiles were removed by distillation under reduced pressure. Distillation gave 14 grams (60%) of 3-ethylthio-5,5-dimethylcyclohex-2-ene-1-one, b.p. 92°–96° C. (0.9 mm.)

Analysis:

Calc. for C, 65.2%; H, 8.7%; S, 17.4%

Found for C, 65.3%; H, 9.1%; S, 18.2%.

In the corresponding manner, the following sulfides are obtained:

| Compound | | Physical properties |
|---|---|---|
| 5,5-dimethyl-3-(SC(CH$_3$)$_3$)cyclohex-2-en-1-one | (VIII) | M.P. 60–62° C. |
| 5,5-dimethyl-3-(SC$_{12}$H$_{25}$)cyclohex-2-en-1-one | (XIX) | B.P. 185° C. (0.18 mm.). |
| 5,5-dimethyl-3-(SC$_5$H$_{11}$)cyclohex-2-en-1-one | (XX) | M.P. 50–55° C. |
| 5,5-dimethyl-3-(SCH$_2$CH$_2$OH)cyclohex-2-en-1-one | (XXI) | M.P. 40–42° C. |
| 5,5-dimethyl-3-(SCH$_2$CH=CH$_2$)cyclohex-2-en-1-one | (X) | B.P. 79° C. (0.1 mm.). |
| 5,5-dimethyl-3-(SCH$_2$-C$_6$H$_4$-Cl)cyclohex-2-en-1-one | (XXII) | M.P. 83–86° C. |
| 5,5-dimethyl-3-(SCH$_2$CH$_2$S-C$_6$H$_4$-Cl)cyclohex-2-en-1-one | (XI) | Yellow oil. |
| 5,5-dimethyl-3-(S-C$_6$H$_4$-C(CH$_3$)$_3$)cyclohex-2-en-1-one | (XVIII) | M.P. 80–83° C. |
| 5,5-dimethyl-3-(S-C$_6$H$_4$-Cl)cyclohex-2-en-1-one | (XXV) | M.P. 74–78° C. |
| 5,5-dimethyl-3-(S-C$_6$H$_4$-CH$_3$)cyclohex-2-en-1-one | (XXVI) | M.P. 80–83° C. |

| Compound | | Physical properties |
|---|---|---|
| 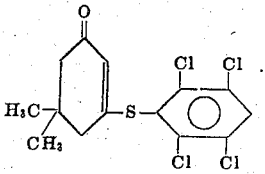 | (XXVII) | M.P. 145–150° C. |
| 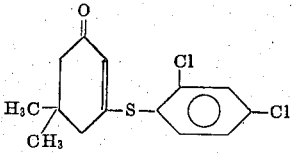 | (XXVIII) | M.P. 63–65° C. |
| 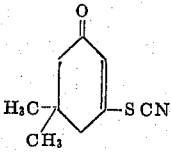 | (IX) | B.P. 97° C. (0.4). |
| 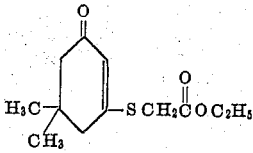 | (XXIX) | B.P. 122–124° C. (0.01 mm.). |
| 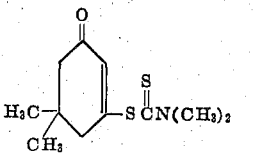 | (XXX) | M.P. 118–120° C. |
| 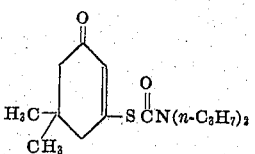 | (XXXI) | M.P. 102–106° C. |
| 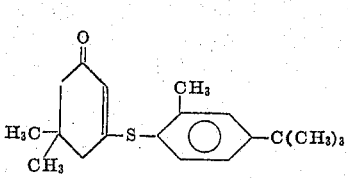 | (XXIII) | M.P. 87–90° C. |

EXAMPLE 6

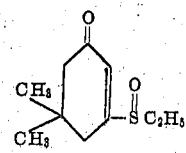 (XII)

To a solution of 60 grams (0.33 moles) of 3-ethylthio-5,5-dimethylcyclohex-2-ene-1-one in 300 ml. of acetic acid was added dropwise 36.6 grams (0.33 mole) of 30 percent hydrogen peroxide maintaining the temperature below 20°. The reaction mixture was stirred 12 hours and approximately 1 gram of manganese dioxide was added to decompose any excess peroxide. The acetic acid was removed by vacuum distillation and the residue was dissolved in methylene chloride, washed with water, followed by a dilute sodium bicarbonate solution and was dried over magnesium sulfate. The solvent was removed in the usual manner and the residue was triturated with hexane giving 39 grams (59% yield) of 3-ethylsulfinyl)-5,5-dimethylcyclohex-2-ene-1-one melting point 51°–53° C. product.

Analysis:
 Calc. for C. 60.0; H, 8.0%; S, 16.0%.
 Found for C, 60.2%; H, 7/74%; S, 16.4%.

In the corresponding manner, the following sulfoxides were obtained:

| Compound | | Physical properties |
|---|---|---|
| 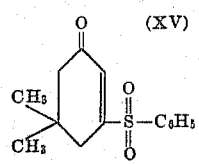 | (XVII) | M.P. 84-86° C. |
| | (XXXII) | M.P. 130-132° C. |
| | (XIII) | Orange oil. |

EXAMPLE 7

(XV)

34.5 grams (0.2 moles) of metachloroperbenzoic acid was dissolved in 750 ml. of chloroform. To this solution was added dropwise with stirring, 23.2 grams (0.1 mole) of 3-phenylsulfenyl-5,5-dimethylcyclohex-2-ene-1-one dissolved in 350 ml. of chloroform, maintaining the reaction temperature at 30° C. The reaction mixture was stirred at room temperature for 72 hours, then refluxed for 8 hours. The solid was filtered and the chloroform solution was washed with water followed by dilute dicarbonate solution, and the chloroform was removed by distillation under vacuum. Drying of the residue was accomplished by azeotroping with benzene, which yielded an oil which was triturated with cold hexane to give 19 grams of 3-phenyl-sulfonyl-5,5-dimethyl-cyclohex-2-ene-1-one melting at 76°–81° C. as product.

Analysis:
Calc. for C, 62.5%; H, 6.1%; S, 12.2%
Found for C, 62.9%; H, 5.97%; S, 12.9%

In the corresponding manner, the following sulfones are obtained.

| Compound | | Physical properties |
|---|---|---|
| | (XII) | M.P. 75° C. |
| | (XVI) | M.P. 152-153° C. |

EXAMPLE 8

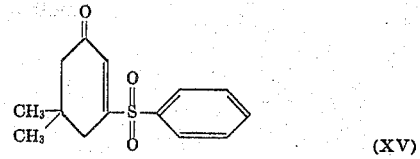

(XV)

To a solution of 77.5 g. (0.47 mole) of sodium benzenesulfinate in 500 ml. of methanol was added 75 g. (0.47 mole) of 3-chloro-5,5-dimethylcyclohex-2-ene-1-one and the reaction mixture was heated under reflux for 7 days. The volatiles were removed by distillation under reduced pressure and the residue was extracted with 250 ml. of chloroform. The chloroform solution was washed with water and the volatiles were removed in the usual manner. Trituration of the residue with ether and recrystallization of the resultant solid gave 60 g. (48% yield) of 3-phenylsulfonyl-5,5-dimethylcyclohex-2-ene-1-one as a yellow solid, m.p. 75°–80° C.

It will be realized by the artisan that all of the foregoing compounds contemplated by the present invention possess desirable plant growth regulating properties which may consist of one or more of the following: The stunting of growth of monocotyledonous and dicotyledonous crop and weed plants, ornamental shrubs and trees; increasing the yield of leguminous plants, and/or their protein content; affecting the fruit set and sex expression of spermatophytic plants; increasing the resistance of vegetation to damage caused by drought and frost; increasing the yield and/or sugar content of sugarbeets or sugar cane; synergistic activity on the defoliation of cotton by known defoliants such as tributyl phosphorotrithioate and/or partially inhibiting the regrowth on defoliated plants; retarding the growth of grasses either alone or in synergistic combinations with known retardants such as maleic hydrazide; and reducing or preventing the sprouting of potatoes. It will also be appreciated that other types of biological activity can be anticipated such as the control of fungi, bacteria or the control of insects or acarids by selected compounds described in this invention.

It will be appreciated that the instant specifications and samples are set forth by way of illustration and not limitation, and that various modification and changes may be made without departing from the spirit and scope of the present invention which is to be limited only by the scope of the appended claims.

What is claimed is:

1. The method of controlling the growth of plants which comprises applying thereto an effective amount of a compound of the formula

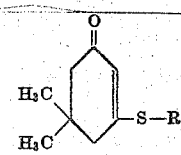

in which R is alkyl of 1 to 14 carbon atoms, hydroxyalkyl of 1 to 4 carbon atoms or alkenyl of 3 to 5 carbon atoms.

2. The method of claim 1 wherein the compound is applied to the plant.

3. The method of claim 1 wherein the compound is applied to soil in which the plant is grown.

4. Method according to claim 1 wherein such compound is 3-ethylthio-5-,5-dimethylcyclohex-2-ene-1-one of the formula

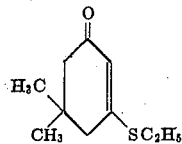

(1)

5. Method according to claim 1 wherein such compound is 3-methylthio-5,5-dimethylcyclohex-2-ene-1-one of the formula

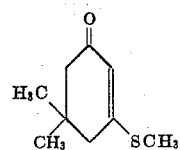

(2)

6. Method according to claim 1 wherein such compound is 3-isopropylthio-5,5-dimethylcyclohex-2-ene-1-one of the formula

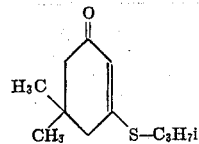

(4)

* * * * *

PO-1050
(5/69)

UNITED STATES PATENT OFFICE
CERTIFICATE OF CORRECTION

Patent No. 3,820,975          Dated June 28, 1974

Inventor(s) Albert J. Poje and Peter E. Newallis

It is certified that error appears in the above-identified patent and that said Letters Patent are hereby corrected as shown below:

Col. 2, line 66, compound (VII), after "$CO_2$" insert -- H --.

Col. 3, line 48, compound (XIV), under " O " insert -- $\overset{\overset{O}{\|}}{\underset{S}{\|}}$ --.

Col. 19, Table 3, correct formula of compound (XII) to read as follows:

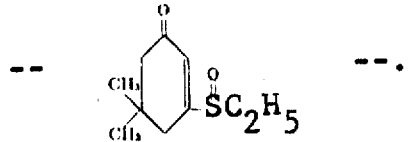

Col. 20, Table 4 in the heading of the last column of Table, cancel "after" first occurrence and substitute therefor -- Mortality --.

Col. 22, in the Table for Example 5, insert between compounds (XI) and (XVIII) the following:

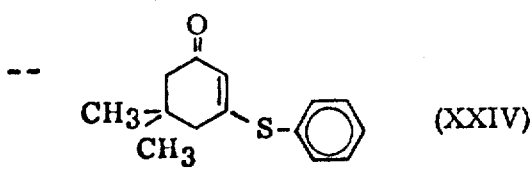

M.P. 46-50° C.

Signed and sealed this 5th day of November 1974.

(SEAL)
Attest:

McCOY M. GIBSON JR.
Attesting Officer

C. MARSHALL DANN
Commissioner of Patents